UNITED STATES PATENT OFFICE.

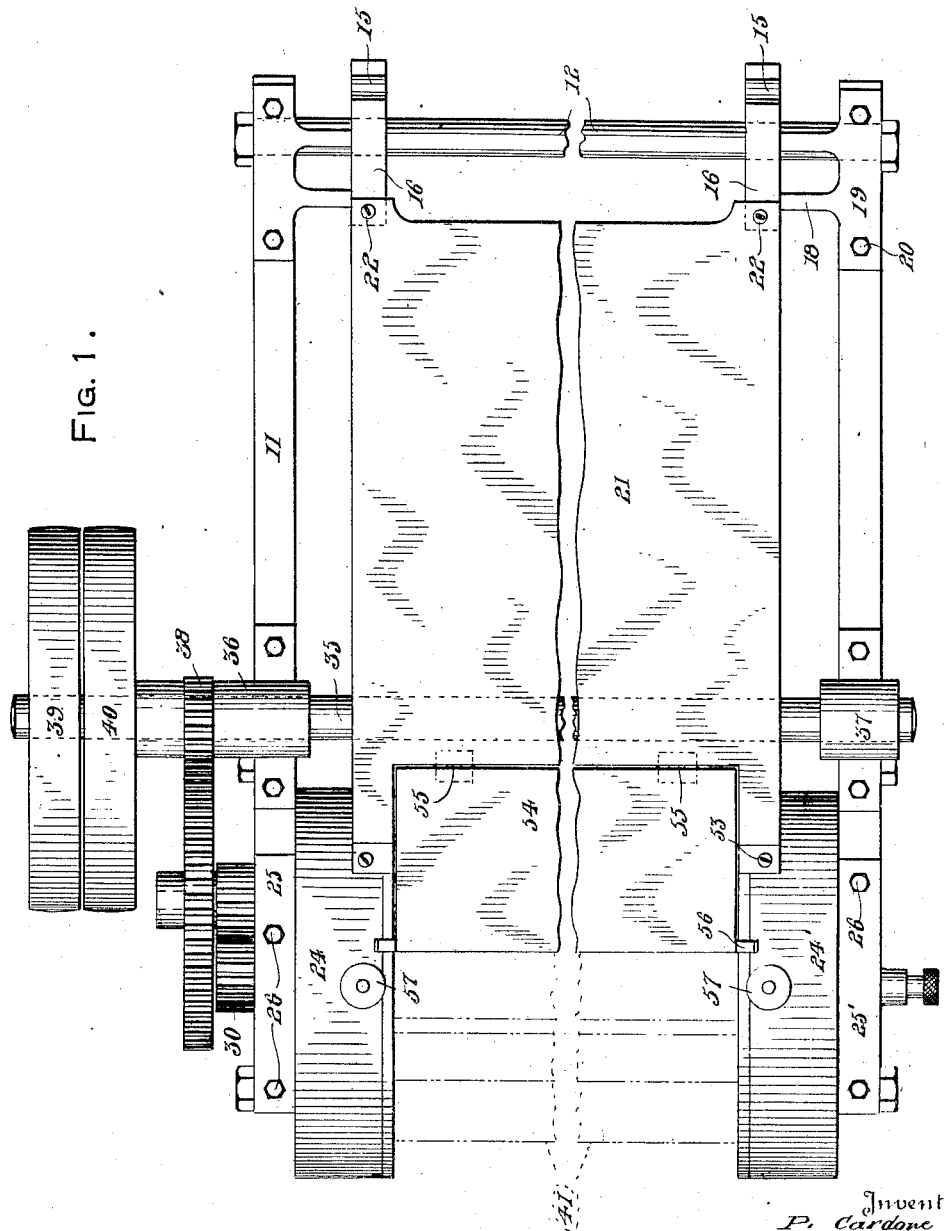

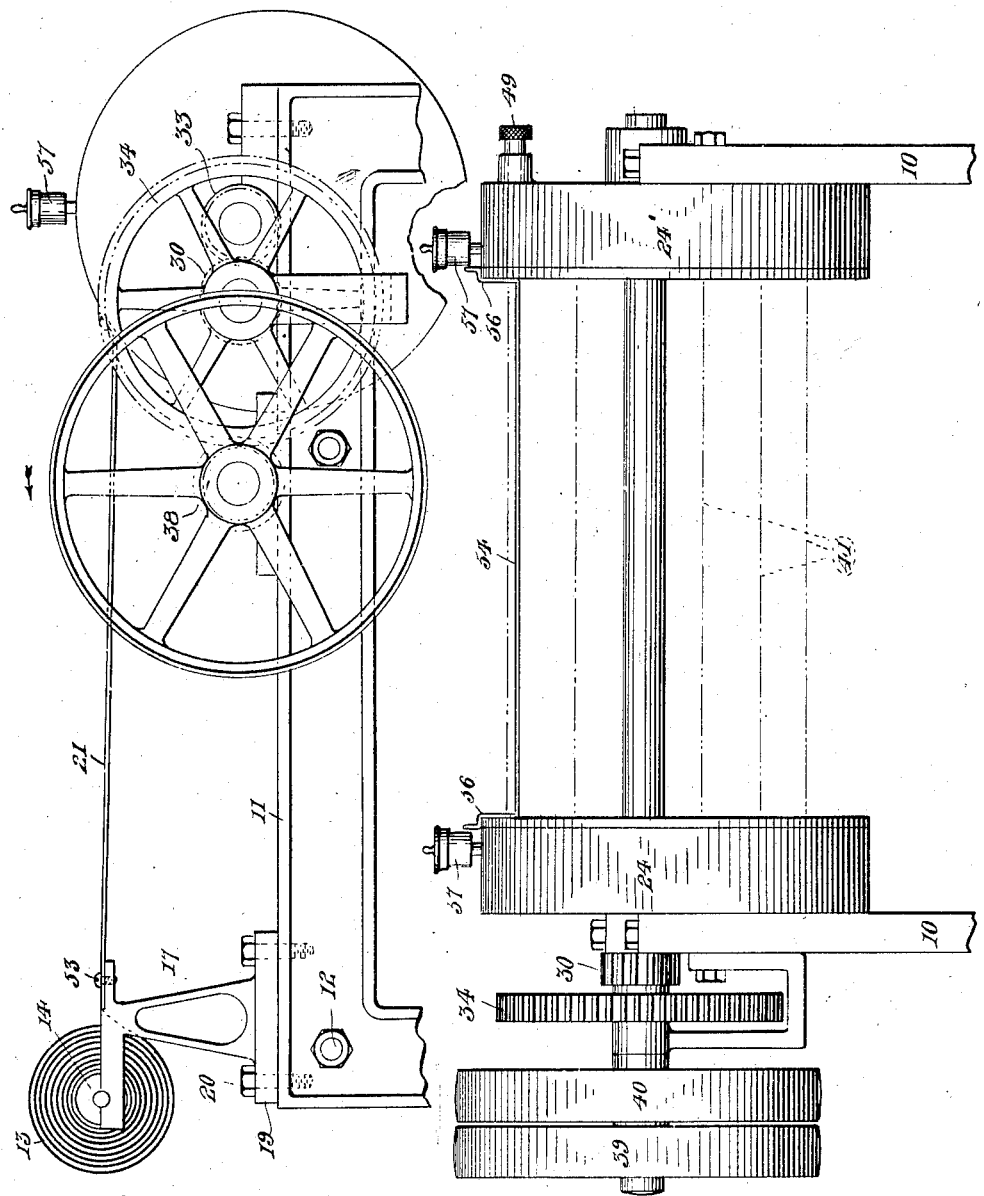

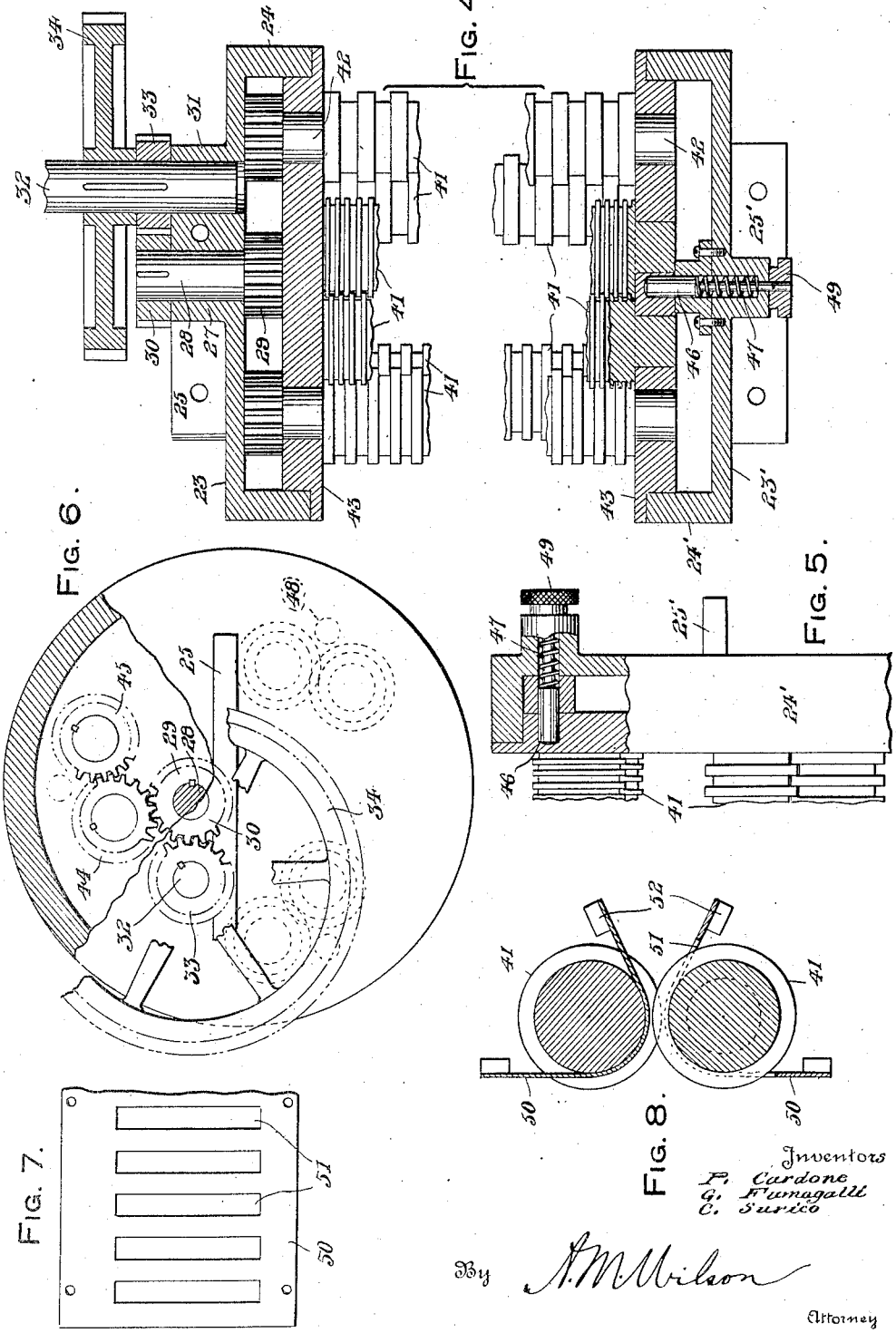

PAUL CARDONE, GIACOMO FUMAGALLI, AND CARMINE SURICO, OF NEW YORK, N. Y.

NOODLE-CUTTING MACHINE.

1,357,611.     Specification of Letters Patent.     Patented Nov. 2, 1920.

Application filed May 4, 1920. Serial No. 378,927.

*To all whom it may concern:*

Be it known that we, (1) PAUL CARDONE, (2) GIACOMO FUMAGALLI, and (3) CARMINE SURICO, subjects of the King of Italy, residing at New York, in the county of New York and State of New York, have invented certain new and useful Improvements in Noodle-Cutting Machines, of which the following is a specification.

The present invention relates to certain new and useful improvements in noodle cutting machines, and has for its primary object to construct a machine embodying a plurality of sets of coöperating tongue and grooved rollers of different dimensions for cutting the noodle strips of different widths.

A further object of the invention is to provide a noodle cutting machine having sets of cutting rollers of different dimensions with the supporting means for the cutting rollers being rotatably adjustable to present the desired set of rollers for operation.

A still further object of the invention is to provide a slotted guard plate for the rollers and through which the annular ribs or tongues upon the cutting rollers project to prevent the cut noodle or dough strip from winding on the cutting roller.

The invention also contemplates other novel details of construction such as a platform for supporting the dough strip fed from a roll and a movable apron extending from the platform to a point adjacent the cutting rollers and devices for retaining the cutting roller in adjusted positions.

With the above general objects in view and others that will appear as the nature of the invention is better understood, the same consists in the novel form, combination and arrangement of parts hereinafter more fully described, shown in the accompanying drawings and claimed.

In the drawings wherein like reference characters indicate corresponding parts throughout the several views, Figure 1 is a top plan view of a noodle cutting machine constructed in accordance with the present invention, Fig. 2 is a side elevational view of the same partially broken away showing a roll of dough supported upon the frame, Fig. 3 is a front elevational view of the machine with the supporting frame broken away, Fig. 4 is a detail sectional view, partially broken away of the noodle cutting rollers showing the driving connections and devices for holding the rotatably adjustable cylinders in fixed position, Fig. 5 is a fragmentary detail sectional view of the frame for supporting the cutting cylinders showing the tension pin for maintaining the cutting cylinders in adjusted position, Fig. 6 is an end elevational view, partially broken away of the cutting roller supporting disk showing the meshing gears for driving the cutting rollers, Fig. 7 is a plan view, partially broken away of a slotted guard plate associated with the cutting cylinders, and Fig. 8 is a cross sectional view of a pair of coöperating cutting cylinders with the slotted guard plates operatively positioned relative thereto.

Briefly described, the present invention has for its primary object to provide a machine for cutting noodles in different widths and embodies a supporting frame structure upon which a pair of circular plates are rigidly mounted. A disk is rotarially adjustable upon each plate and carries a series of cutting cylinders that are adapted to be selectively moved to a position whereby a strip of dough fed through the machine is delivered thereto, while slotted guard plates associated with the cutting cylinders insure the direct passage of the cut noodles through the machine and prevent the winding of the cut noodles upon the cylinders. The driving devices include a power gear journaled upon the plate and positioned between the plate and disk while meshing gears journaled upon the disk and fixed to the cylinders are adapted to be shifted to cause a gear of each set to be selectively engaged with the power gear.

Referring more in detail to the accompanying drawings and wherein there is shown the preferred embodiment of the invention the reference numeral 10 denotes the legs of a supporting frame having a cross head 11 at its upper end connected at the rear ends thereof by a cross rod 12 shown more clearly in Figs. 1 to 3.

A roll of dough 13 has the spindle 14 thereof resting in the sockets 15 of the arms 16 carried by the brackets 17, which brackets 17 extend perpendicularly relative to the carrying arms 18 that project inwardly from the mounting base 19 secured as at 20 to the cross heads 5, a bracket 17 being secured to each cross head as shown in Fig. 1. A platform 21 is secured at its rear corner edges as at 22 to the forward ends of the bracket arms 16 and is supported at its forward end in a manner presently to be described.

A housing plate is fixed to each side head 11 of the frame, said housings including circular plates 23, 23', provided with opposed inwardly directed flanges 24, 24' and respectively carrying mounting brackets 25, 25' that are secured to the frame heads 11 by retaining bolts 26. The power driving mechanism is associated with the housing plate 23 and includes the provision of a journal bearing 27 extending from the housing plate 23 opposite to the flange 24 with a stub shaft 28 journaled therein and having a gear wheel 29 fixed to the inner end thereof. A small pinion 30 is keyed to the outer end of the stub shaft 28 as shown in detail in Fig. 4 and said shaft 28 is maintained in position in the housing bearing 27 by the gear 29 and pinion 30. A journal bearing extension 31 is carried by the housing plate 23 adjacent the bearing 27 and rotatably supports a shaft 32 upon which a pinion 33 is keyed for meshing engagement with the pinion 30, while a relatively large gear wheel 34 is keyed to the shaft 32 adjacent the pinion 33 to rotate with said pinion.

The driving mechanism for the stub shaft 28 and large gear wheel 34 includes a power shaft 35 journaled in bearings 36 and 37 mounted upon the frame heads 11, a pinion 38 being fixed to the shaft 35 adjacent the bearing 36 for constant meshing engagement with the gear wheel 34. An idler pulley 39 and fixed pulley 40 are carried by the shaft 35 and are belt driven, the driving pulley 40 communicating power to the shaft 35 and through the meshing pinion 38 and gear 34 to the pinions 33 and 30 for rotation of the stub shaft 28 with the drive pinion 29 fixed upon the inner end thereof.

The noodle cutting cylinders 41 are arranged in spaced pairs and the peripheries thereof are tongued and grooved so that the tongues of one cylinder extend into the grooves of the adjacent coöperating cylinder, the ends 42 of the cylinders being reduced in diameter and journaled in openings provided in the disks 43 that are rotatably supported within the circular flanges 24, 24' of the housing plates 23, 23'. The bearing ends 42 of the cutting cylinders extend through the disk 43 associated with the housing plate 23 and have secured upon the inner ends thereof pinions 44 and 45 that are in constant mesh with each other, the pinion 44 being nearer the axis of rotation of the disk 43 than the pinion 45, as illustrated in Fig. 6 and for purposes presently to appear.

When it is desired to position any one of the sets of rollers for cutting operation, the disks 43 are rotated in the plate flanges 24, 24' until the desired pinions 44 of the chosen set of cylinders is in meshing contact with the driving pinion 29, and when such adjustment is reached, the pin 46 tensioned as at 47 is received in the opening 48 in the disk 43 that is associated with the housing plate 23' to hold the disks 43 immovable relative to said housing, the pin 46 and openings 48 being arranged adjacent the peripheries of the plates and disks to prevent relative rotation thereof. A head 49 upon the pin 46 is grasped to retract the pin against the tension of the spring 47 to permit rotation of the disks 43 as may be desired.

A guard for the cut strips of dough as shown in Figs. 7 and 8 includes a plate 50 having a plurality of spaced slots 51 therein that are adapted to receive the tongues upon the cutting cylinders 41 in a manner as illustrated in Fig. 8, the guard plates 50 being bent to the curved formation shown with clips 52 carried by the ends thereof for attachment to the disks 43 to be movable therewith.

The forward end of the platform 21 is secured as at 53 to the housing flanges 24, 24' while an apron 54 is hinged as at 55 to the forward edge of the platform and is provided with side fingers 56 that engage the upper sides of the housing flanges 24 to hold the same positioned relative to the cutting cylinders 41.

A roll of dough 13 has the strip thereof fed over the platform 21 and apron 54 between a desired set of rollers 41. The power from the shaft 35 is communicated to the pinion 29 in the manner above described and said pinion 29 meshing with the desired pinion 44 causes a rotation of the adjacent set of cutting cylinders 41 with the dough strip fed therebetween. The tongue and groove formation of the cylinders 41 cuts the dough into narrow strips while the guard plates 50 will prevent the cut strips of dough from winding upon the cylinders 41 as will at once be obvious. When it is desired to present a different size set of cutting cylinders for reception of the dough strip, the pin 46 is removed from the opening 48 in the disk 43 against the tension of the spring 47 and by turning the disks 43, as by gripping the cutting cylinders 41 the pin 46 will ride over the inner face of the disk 43 until the same registers with the succeeding disk opening 48, at which time the pinion 44 of the other set of cylinders is in meshing engagement with the pinion 29. As shown in Figs. 1 to 3, the meshing gears within the housings are lubricated by means of the oil receptacles 57.

It will therefore be seen that all noodles of different sizes may be cut from the single machine disclosed herein, by the simple adjustment of the cutting cylinders, and while there is herein shown and described the preferred embodiment of the invention it is nevertheless to be understood that minor changes may be made therein without departing from the spirit and scope of the invention as claimed.

What is claimed as new is:—

1. A noodle cutting machine comprising a supporting frame, housings mounted on said frame, a rotatable disk supported in each housing, pairs of coöperating cutting cylinders journaled in said disks, and driving means in one of said housings for said cutting cylinders.

2. A noodle cutting machine comprising a supporting frame, housings mounted on said frame, a rotatable disk supported in each housing, pairs of coöperating cutting cylinders journaled in said disks, driving means in one of said housings for said cutting cylinders, and means in the other housing for holding the disks in rotatably adjusted positions.

3. A noodle cutting machine comprising a supporting frame, housings mounted on said frame, a rotatable disk supported in each housing, pairs of coöperating cutting cylinders journaled in said disks, driving means in one of said housings for said cutting cylinders, and means in the other housing for holding the disks in rotatably adjusted positions, said means including a tensioned pin carried by the housing and the disk supported in said housing having openings therein for the reception of said pin.

4. A noodle cutting machine comprising a supporting frame, housings mounted on said frame, a rotatable disk supported in each housing, pairs of coöperating cutting cylinders journaled in said disks, driving means in one of said housings for said cutting cylinders, means in the other housing for holding the disks in rotatably adjusted positions, said driving means including a pinion journaled in said housing, and meshing gears carried by each set of cutting cylinders adapted to have one of said meshing gears moved into engagement with the driving pinion.

5. A noodle cutting machine comprising a supporting frame, housings mounted on said frame, a rotatable disk supported in each housing, pairs of coöperating cutting cylinders journaled in said disks, driving means in one of said housings for said cutting cylinders, means in the other housing for holding the disks in rotatably adjusted positions, said driving means including a stub shaft journaled in said housing, a pinion upon the inner end of said shaft, meshing gears carried by said cutting cylinders adapted to be moved into operative engagement with said pinion, and driving means associated with the outer end of said stub shaft.

6. A noodle cutting machine comprising a supporting frame, housings mounted on said frame, a rotatable disk supported in each housing, pairs of coöperating cutting cylinders journaled in said disks, driving means on one of said housings for said cutting cylinders, means in the other housing for holding the disks in rotatably adjusted positions, said pairs of cutting cylinders having coöperating tongues and grooves formed on the peripheries thereof, and means associated with said cylinders to prevent the cut dough strips from winding thereon.

7. A noodle cutting machine comprising a supporting frame, housings mounted on said frame, a rotatable disk supported in each housing, pairs of coöperating cutting cylinders journaled in said disks, driving means on one of said housings for said cutting cylinders, means in the other housing for holding the disks in rotatably adjusted positions, said pairs of cutting cylinders having coöperating tongues and grooves formed on the peripheries thereof, slotted plates having the tongues of said cylinders projecting through slots thereof whereby the cut strips of dough will not wind thereon.

8. A machine of the type described comprising a frame, housings supported thereon, sets of coöperating tongue and grooved cylinders journaled at their ends in said housings with the journal bearings therefor rotatably adjustable in said housings, driving means for said cutting cylinders associated with one housing, and means for holding the cutting rotarially fixed associated with the other housing.

9. A machine of the type described comprising a frame, housings supported thereon, sets of coöperating tongue and grooved cylinders journaled at their ends in said housings with the journal bearings therefor rotatably adjustable in said housings, driving means for said cutting cylinders associated with one housing, means for holding the cutting rotarially fixed associated with the other housing, said driving means including meshing pinions carried by the ends of said cutting cylinders, and a driving pinion adapted selectively to engage one of the sets of meshing gears.

In testimony whereof we affix our signatures.

PAUL CARDONE.
GIACOMO FUMAGALLI.
CARMINE SURICO.